(12) United States Patent
Hsu et al.

(10) Patent No.: US 12,010,197 B2
(45) Date of Patent: Jun. 11, 2024

(54) SYSTEM, METHOD AND COMPUTER-READABLE MEDIUM FOR DATA ACCESSING

(71) Applicant: 17LIVE Japan Inc., Tokyo (JP)

(72) Inventors: Yung-Chi Hsu, Taipei (TW); Chia-Pin Chen, Taipei (TW); Jhu-Kai Song, Taipei (TW); Liang-Tse Chiang, Taipei (TW)

(73) Assignee: 17LIVE JAPAN INC., Tokyo (JP)

( * ) Notice: Subject to any disclaimer, the term of this patent is extended or adjusted under 35 U.S.C. 154(b) by 0 days.

(21) Appl. No.: 18/313,098

(22) Filed: May 5, 2023

(65) Prior Publication Data

US 2024/0031454 A1    Jan. 25, 2024

(30) Foreign Application Priority Data

Jul. 20, 2022  (JP) .................................. 2022-115919

(51) Int. Cl.
*H04L 67/10* (2022.01)
*H04L 12/24* (2006.01)
*H04L 12/26* (2006.01)
*H04L 67/61* (2022.01)

(52) U.S. Cl.
CPC .................................. *H04L 67/61* (2022.05)

(58) Field of Classification Search
CPC ......... H04L 67/61; H04L 67/22; H04L 29/06; H04L 29/08
USPC ........................................................ 709/201
See application file for complete search history.

(56) References Cited

U.S. PATENT DOCUMENTS

| | | | | |
|---|---|---|---|---|
| 10,157,648 B1* | 12/2018 | Mazumder | ............. | A23C 3/076 |
| 10,341,908 B1* | 7/2019 | Bhartia | ............. | H04W 36/0038 |
| 2010/0188500 A1* | 7/2010 | Bouchard | .......... | G01N 21/8901 |
| | | | | 348/370 |
| 2011/0146240 A1* | 6/2011 | Wilhelm | ................ | F01N 3/208 |
| | | | | 60/287 |
| 2011/0238819 A1* | 9/2011 | Fukagawa | ............. | G06F 9/5083 |
| | | | | 709/224 |

(Continued)

FOREIGN PATENT DOCUMENTS

| | | |
|---|---|---|
| CN | 104881479 A | 9/2015 |
| JP | 2003-216583 A | 7/2003 |

(Continued)

OTHER PUBLICATIONS

Notice of Reasons for Refusal dated Sep. 14, 2022, issued in corresponding Japanese Patent Application No. 2022-115919, with English translation (12 pgs.).

*Primary Examiner* — Jude Jean Gilles
(74) *Attorney, Agent, or Firm* — Pillsbury Winthrop Shaw Pittman, LLP

(57) ABSTRACT

The present disclosure relates to a system, a method and a computer-readable medium for data accessing. The method includes receiving a request, receiving a status parameter of an endpoint corresponding to the request, receiving a number of times of receiving the request in a period of time, and determining a delay time length for transmitting the request according to the status parameter of the endpoint or the number of times of receiving the request in the period of time. The present disclosure can achieve more efficient resource allocation and can prevent server outage.

8 Claims, 15 Drawing Sheets

(56) References Cited

U.S. PATENT DOCUMENTS

| | | | | |
|---|---|---|---|---|
| 2014/0325642 A1* | 10/2014 | Lee | ............... | H04L 63/0876 |
| | | | | 726/19 |
| 2016/0165599 A1* | 6/2016 | Xu | ............... | H04W 72/0446 |
| | | | | 370/315 |
| 2017/0078178 A1* | 3/2017 | Kanemasa | ............ | H04L 67/62 |
| 2018/0077178 A1* | 3/2018 | Beauchesne | ......... | G06N 5/022 |
| 2018/0167390 A1* | 6/2018 | Castinado | .......... | H04L 63/0876 |
| 2021/0120483 A1* | 4/2021 | Hodoshima | .......... | H04W 48/20 |

FOREIGN PATENT DOCUMENTS

| | | |
|---|---|---|
| JP | 2007-233559 A | 9/2007 |
| JP | 2012-068734 A | 4/2012 |
| JP | 2015-011566 A | 1/2015 |
| JP | 2016-127531 A | 7/2016 |
| JP | 7062248 B1 | 5/2022 |

\* cited by examiner

Request table 118

| request | corresponding user | corresponding endpoint | receiving times | delay time length |
|---|---|---|---|---|
| R1 | U1 | EP1 | 2 | T1 |
| R2 | U1 | EP2 | 1 | T2 |
| R3 | U1 | EP3 | 4 | T3 |

FIG. 11

Endpoint status table 112

| endpoint | severity level (unhealthy level) |
|---|---|
| EP1 | Level 2 |
| EP2 | Level 1 |
| EP3 | Level 4 |

FIG. 12

User status table 114

| user | status parameter | |
| --- | --- | --- |
| | contribution score | level |
| U1 | 60 | 3 |

FIG. 13

User database 310

| user | status parameter | |
|---|---|---|
| | contribution score | level |
| U1 | 60 | 3 |
| U2 | 75 | 5 |
| U3 | 30 | 2 |

FIG. 14

SYSTEM, METHOD AND COMPUTER-READABLE MEDIUM FOR DATA ACCESSING

CROSS-REFERENCE TO RELATED APPLICATIONS

This application is based on and claims the benefit of priority from Japanese Patent Application Serial No. 2022-115919 (filed on Jul. 20, 2022), the contents of which are hereby incorporated by reference in its entirety.

A. TECHNICAL FIELD

The present disclosure relates to data accessing and, more particularly, to data accessing with a server.

B. BACKGROUND

Data accessing over the Internet usually involves a user terminal (such as a smartphone, a tablet or a computer) used by a user, an application (or an application software) that runs on the user terminal, and a server of the application (or an application server) that communicates with the user terminal.

The user may initiate a data request through a user interface of the application, which may involve a clicking, taping, or scrolling action. The request is then transmitted from the user terminal to the server. Finally, the server sends a response corresponding to the request to the user terminal, thus completing the data accessing.

As the server gets accessed by more and more users, it is important to keep the server stable and maintain acceptable user experience during the data accessing.

C. SUMMARY

A method according to one embodiment of the present disclosure is a method for data accessing being executed by one or a plurality of computers, and includes: receiving a request, receiving a status parameter of an endpoint corresponding to the request, receiving a number of times of receiving the request in a period of time, and determining a delay time length for transmitting the request according to the status parameter of the endpoint or the number of times of receiving the request in the period of time.

A system according to one embodiment of the present disclosure is a system for data accessing that includes one or a plurality of computer processors, and the one or plurality of computer processors execute a machine-readable instruction to perform: receiving a request, receiving a status parameter of an endpoint corresponding to the request, receiving a number of times of receiving the request in a period of time, and determining a delay time length for transmitting the request according to the status parameter of the endpoint or the number of times of receiving the request in the period of time.

A computer-readable medium according to one embodiment of the present disclosure is a non-transitory computer-readable medium including a program for data accessing, and the program causes one or a plurality of computers to execute: receiving a request, receiving a status parameter of an endpoint corresponding to the request, receiving a number of times of receiving the request in a period of time, and determining a delay time length for transmitting the request according to the status parameter of the endpoint or the number of times of receiving the request in the period of time.

D. BRIEF DESCRIPTION OF THE DRAWINGS

FIG. 11 shows an example of the request table 118.

FIG. 12 shows an example of the endpoint status table 112.

FIG. 13 shows an example of the user status table 114.

FIG. 14 shows an example of the user database 310.

E. DETAILED DESCRIPTION

Conventional methods of data accessing between a user terminal and a server face some challenges that need to be addressed.

Conventionally, whenever the user terminal receives a request for data from the user, the user terminal immediately sends out the request to the server to ask for the data. When the user keeps initiating the same request many times in a short period of time, the user terminal will repeatedly send the same request many times to the server, thus increasing the burden/loading of the server. That may further lead to outage of the server or severe delay to the data accessing. For example, when the internet connection is not in good condition for a user terminal, the user may feel a slow response regarding his operation on the user terminal. The user may therefore keep clicking the refresh button on a user interface while he is waiting for the refresh. However, the repeated requests may actually interfere with the accessing process and deteriorate the user experience. In some cases, the repeated requests from a user may even dampen the server's ability or capacity to serve data accessing for other users.

Conventionally, the user terminal has no means to be aware of information of the destination where the data accessing is directed to. For example, the user terminal has no means to know information of the endpoint corresponding to the request. The information may include burden (or loading) status, health status, priority status or severity status of the endpoint. Therefore, the data accessing cannot be treated in a customized manner or an efficient manner for different requests which correspond to different endpoints.

The present disclosure discloses methods and systems to determine the timing of transmitting a request from the user terminal to the server. The transmission timing may be determined by a frequency of receiving the request at the user terminal. The transmission timing may be determined by a status of the endpoint corresponding to the request. The transmission timing may be determined by a contribution score (or contribution level) of the user who initiated the request. Therefore, an optimal timing for the request to be transmitted to the server can be achieved. Technical effects of the present disclosure include: prevention of server outage, and customized and efficient handling of data accessing (efficient resource allocation).

Figure 1:
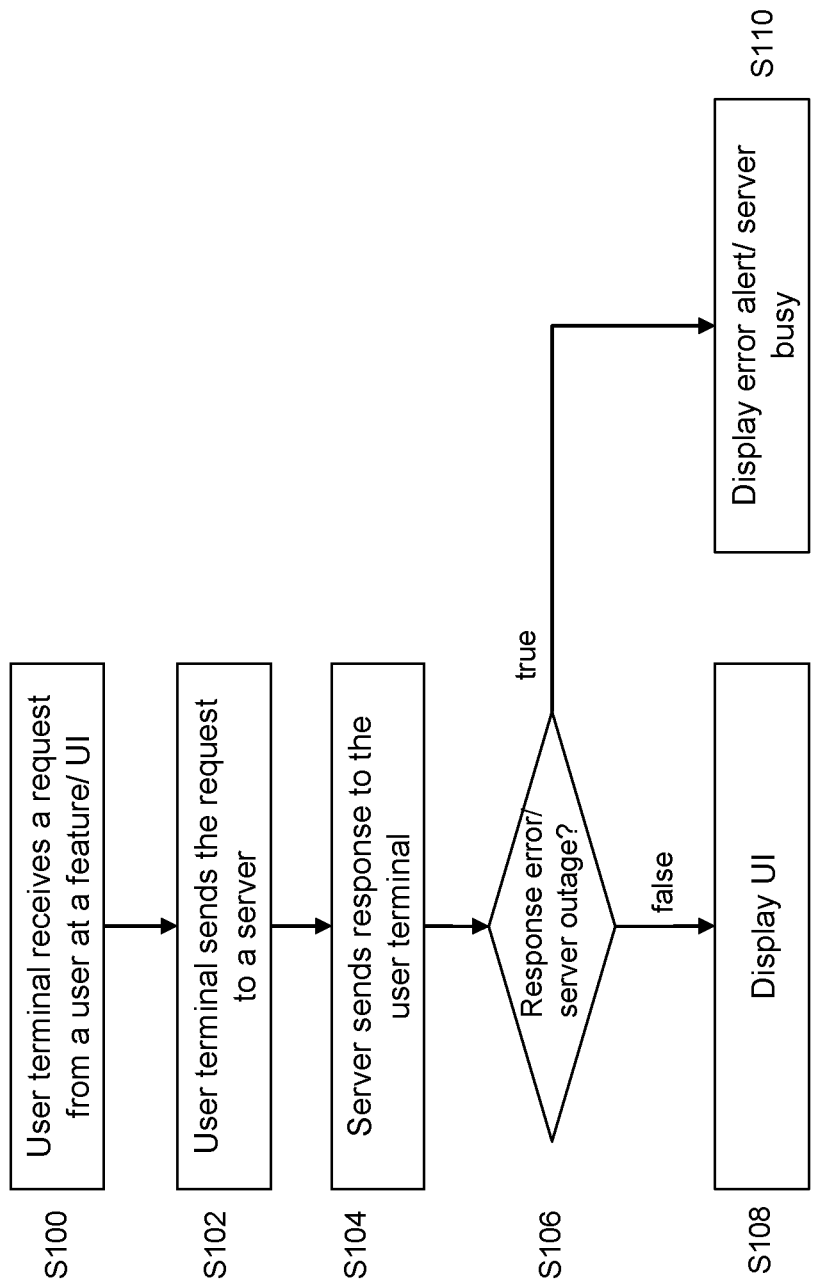
FIG. 1 shows an exemplary flow chart illustrating a conventional method of data accessing.

FIG. 1 shows an exemplary flow chart illustrating a conventional method of data accessing.

In step S100, the user terminal receives a request from a user at a feature or a user interface (UI). For example, the user may initiate the request by clicking or tapping a button on a UI of an application installed on the user terminal.

In step S102, the user terminal sends the request to a server wherein the data corresponding to the request exists.

In step S104, the server sends a response to the user terminal. The response includes the data requested by the user (or by the application on the user terminal).

In step S106, the application (or the feature of the application) checks if the responded data contains error or indicates an outage of the server. If false, the flow goes to step S108. If true, the flow goes to step S110.

In step S108, the user terminal displays the requested result on the UI (of the application) according to the responded data. The data accessing is successfully done.

In step S110, the user terminal displays a message indicating an error, busy server or server outage, according to the responded data.

Figure 2:
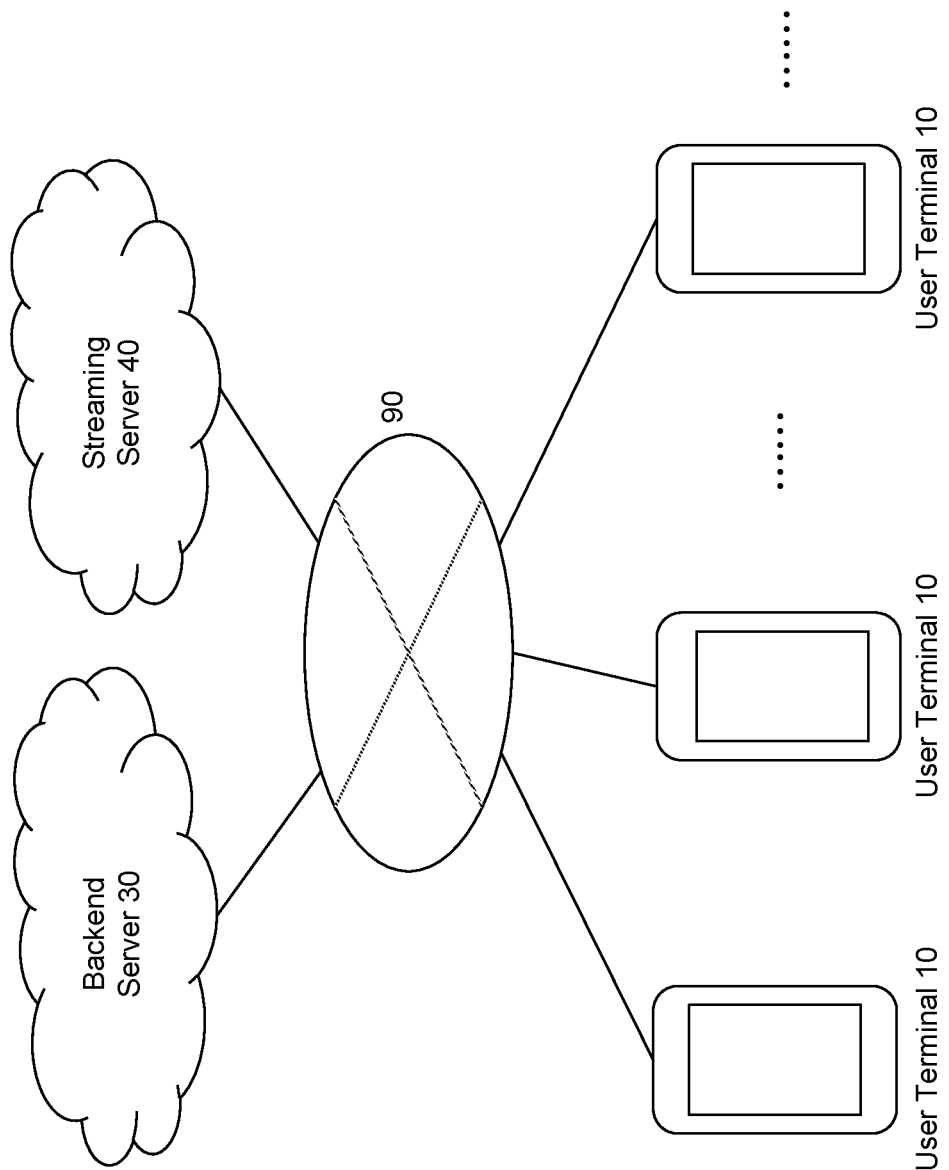
FIG. 2 shows a schematic configuration of a communication system according to some embodiments of the present disclosure.

FIG. 2 shows a schematic configuration of a communication system according to some embodiments of the present disclosure.

The communication system 1 may provide a live streaming service with interaction via a content. Here, the term "content" refers to a digital content that can be played on a computer device. In other words, the communication system 1 enables a user to participate in real-time interaction with other users on-line. The communication system 1 includes a plurality of user terminals 10, a backend server 30, and a streaming server 40. The user terminals 10, the backend server 30 and the streaming server 40 are connected via a network 90, which may be the Internet, for example. The backend server 30 may be a server for synchronizing interaction between the user terminals and/or the streaming server 40. In some embodiments, the backend server 30 may be referred to as the server of an application (APP) provider. The streaming server 40 is a server for handling or providing streaming data or video data. In some embodiments, the backend server 30 and the streaming server 40 may be independent servers. In some embodiments, the backend server 30 and the streaming server 40 may be integrated into one server. In some embodiments, the user terminals 10 are client devices for the live streaming service. In some embodiments, the user terminal 10 may be referred to as viewer, streamer, anchor, podcaster, audience, listener or the like. Each of the user terminal 10, the backend server 30, and the streaming server 40 is an example of an information-processing device. In some embodiments, the streaming may be live streaming or video replay. In some embodiments, the streaming may be audio streaming and/or video streaming. In some embodiments, the streaming may include contents such as online shopping, talk shows, talent shows, entertainment events, sports events, music videos, movies, comedy, concerts or the like.

Figure 3:
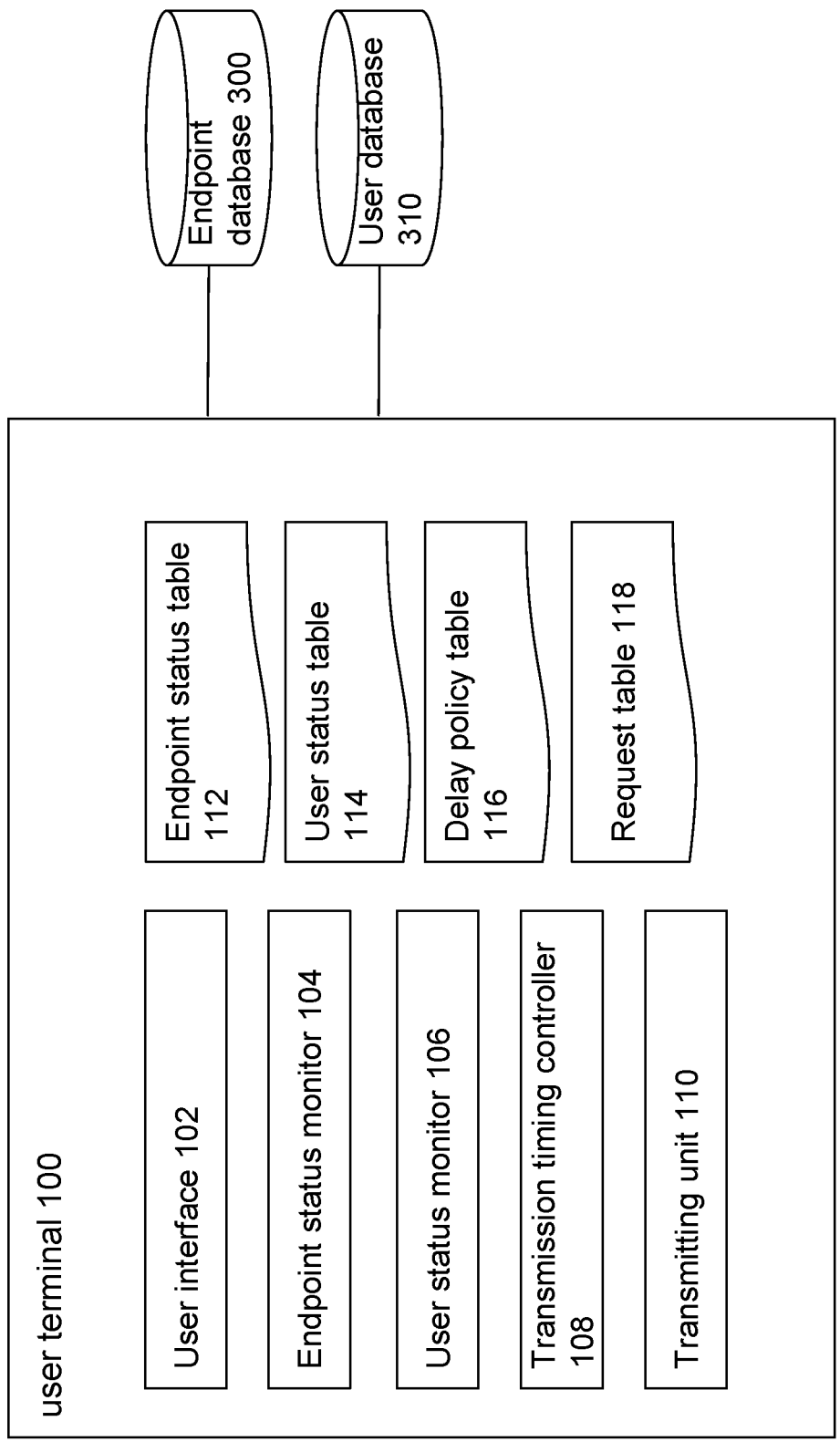
FIG. 3 shows an exemplary block diagram of a user terminal in accordance with some embodiments of the present disclosure.

FIG. 3 shows an exemplary block diagram of a user terminal in accordance with some embodiments of the present disclosure.

The user terminal 100 includes a user interface 102, an endpoint status monitor 104, a user status monitor 106, a transmission timing controller 108, a transmitting unit 110, an endpoint status table 112, a user status table 114, a delay policy table 116 and a request table 118.

The user interface 102 is configured to realize interaction between a user of the user terminal 100 and the user terminal 100. The user interface 102 may include visual, audio or touch sensors to receive visual, audio or touch input from the user. The user interface 102 may be correlated with a page or a feature of an application to accept instructions from the user. The user terminal 100 may receive a request from the user through the user interface 102. The received request is then stored in the request table 118. If a request is repeatedly sent by the user, the number of times of receiving the request (for example, in a period of time) is also recorded in the request table 118.

The endpoint status monitor 104 is configured to monitor the status of an endpoint. The endpoint corresponds to the request from the user, or, the endpoint is where the request is directed to. The endpoint resides on a server external to the user terminal 100. The endpoint status monitor 104 may access (by the Internet, for example) an endpoint database 300 to obtain a status parameter of the endpoint. The status parameter of the endpoint is then stored in the endpoint status table 112. The endpoint database 300 may reside on the server where the endpoint corresponding to the request belongs to. In some embodiments, the endpoint database 300 may reside on another server.

The user status monitor 106 is configured to monitor the status of the user. The user status monitor 106 may access (by the Internet, for example) a user database 310 to obtain a status parameter of the user. The user database 310 may reside on the server where the endpoint corresponding to the request belongs to. In some embodiments, the user database 310 may reside on another server. The status parameter may be or may include a contribution score corresponding to the user. The status parameter may be a level corresponding to the user. The status parameter of the user is then stored in the user status table 114. In some embodiments, the contribution score and/or the level may increase along with commenting behavior, gift sending behavior, viewing behavior, payment or depositing behavior of the user on a live streaming platform.

The transmission timing controller 108 is configured to determine a timing to transmit the request (or a delay time length for transmitting the request) to the server wherein the endpoint corresponding to the request resides. The transmission timing controller 108 may access the request table 118 to receive the number of times of receiving the request in a period of time. The transmission timing controller 108 may access the endpoint status table 112 to receive the status parameter of the endpoint corresponding to the request. The transmission timing controller 108 may access the user status table 114 to receive the status parameter (such as a contribution score) of the user. The transmission timing controller 108 then refers to the delay policy table 116 to determine the delay time length for transmitting the request.

The delay policy table 116 is configured to store the policy or criteria for determining the delay time length for transmitting the request.

In some embodiments, the delay time length is determined to be longer when the number of times of receiving the request in the period of time is greater. For example, the delay time length may be exponentially proportional to the number of times of receiving the request in the period of time. If a user repeatedly sends out the same request many times, the exponential delay mechanism can prevent the user from wasting/consuming/occupying too much server resource (such as capacity, bandwidth, CPU usage rate and/or memory usage rate of the server). In some embodiments, that delay rule acts as a punishment mechanism for those users who tend to keep sending requests many times. That can ensure an efficient allocation/usage of the server resource, and can prevent the server from overloading or outage.

In some embodiments, the delay time length is determined to be longer when the status parameter of the endpoint corresponding to the request indicates a more severe status of the endpoint.

In some embodiments, a more severe status indicates the endpoint is more important. For example, endpoints regarding features such as payment or gift sending may be determined to be more severe than endpoints regarding other features such as commenting, and their status parameters may have higher values. Therefore, the delay time length may be longer and the reliability of successful accessing would be higher.

In some embodiments, a more severe status indicates the endpoint is in a more unhealthy status. An unhealthy endpoint means the endpoint is too busy, is overburdened, or is in any abnormal status. For example, the server's resources for proper operation of the endpoint are not in position or not enough at a particular timing. The delay mechanism can give the endpoint (or the server) sufficient time to recover from an unhealthy state, and can ensure more reliable data accessing. The delay mechanism can prevent the scenario wherein too many requests from different user terminals reach the endpoint (or the server) at the same time.

The status parameter of the endpoint may include a prediction of the status of the endpoint. For example, the status parameter may indicate whether or not the endpoint will be too busy, overburdened, or in any abnormal status at a future timing. Therefore, the delay time length can be determined according to a predicted status of the endpoint, to optimize the data accessing. The prediction of a status of the endpoint may be performed by a machine learning model, which may be implemented on the endpoint database 300.

In some embodiments, the delay time length is determined to be shorter when the contribution score (of the user initiating the request) is higher. In some embodiments, the delay time length is determined to be longer when the contribution score (of the user initiating the request) is lower. A higher contribution score may indicate the corresponding user has more commenting behavior, gift sending behavior, viewing behavior, payment or depositing behavior on a live streaming platform. That is, the user with a higher contribution score has a "higher contribution" to the platform. Therefore, we hope the higher-contribution user can have better data accessing experience. Determining the delay time length according to the contribution score can optimize the data accessing for different users when the available resources are limited. In some embodiments, when the Internet and/or the server (endpoint) are/is in poor conditions, a reverse strategy may be applied. For example, when a poor server/endpoint condition is detected, the delay time length for a request from a higher-contribution user may be determined to be longer enough to guarantee a successful data access for the user.

The request table 118 is configured to store requests that are scheduled to be transmitted to the server. The request table 118 may be referred to or may include a request queue. The request table 118 is configured to store the received requests and information related to the requests. In some embodiments, the number of times of receiving a request is stored along with the request. In some embodiments, the delay time length (or the transmission timing) for a request is stored along with the request.

The transmitting unit 110 is configured to transmit the request to the server, over the Internet, for example. The transmitting unit 110 may access the request table 118 for the determined transmission timing (or the determined delay time length) for the transmission.

Figure 4:
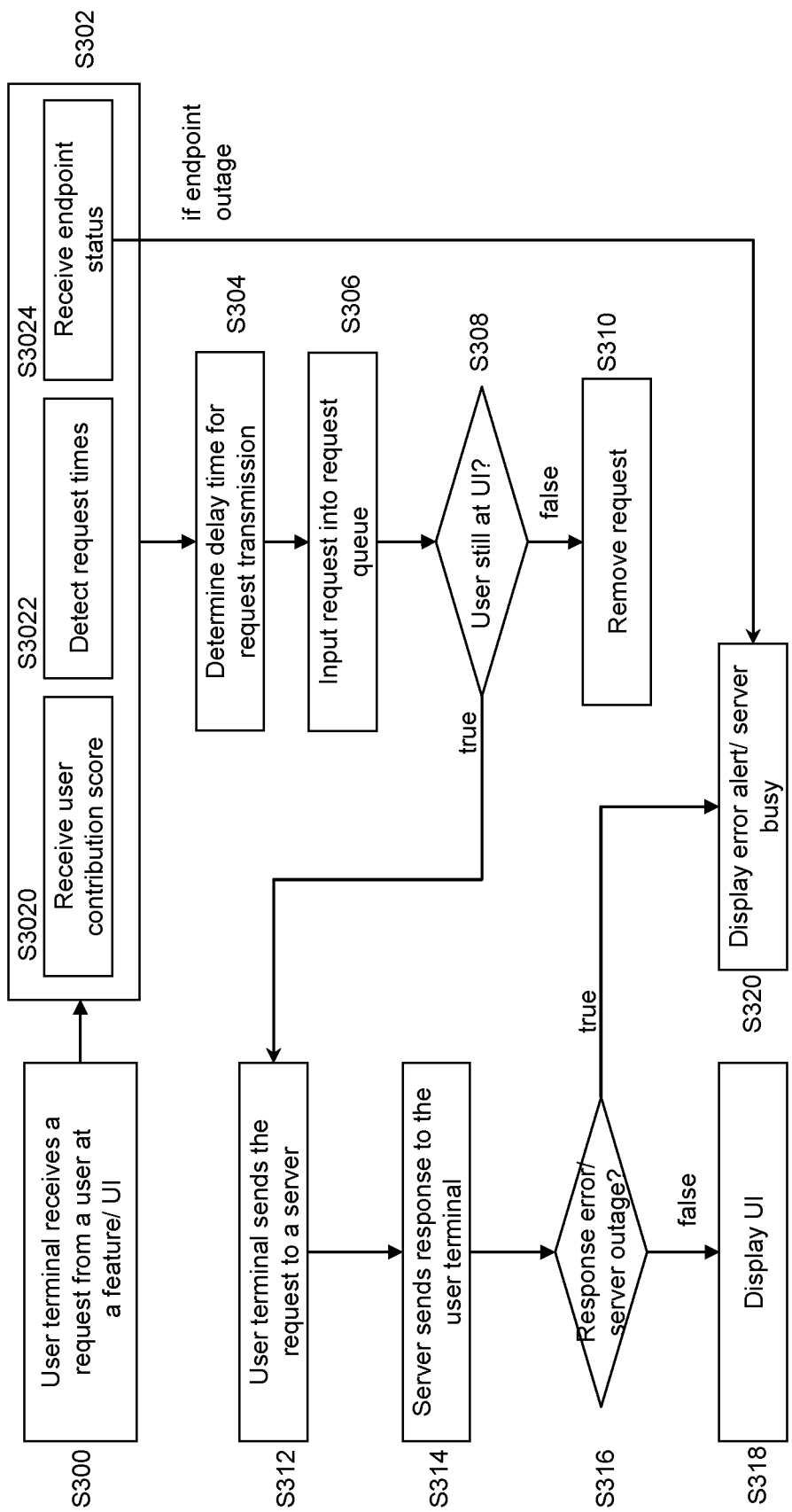
FIG. 4 shows an exemplary flow chart in accordance with some embodiments of the present disclosure.

FIG. 4 shows an exemplary flow chart in accordance with some embodiments of the present disclosure.

In step S300, the user terminal (user terminal 100, for example) receives a request from a user. The request may be received through a feature or UI (user interface) of an application installed on the user terminal. For example, the user may initiate the request by clicking or tapping a button (such as a refresh button) on a UI or a feature of the application. The feature could be a leaderboard feature, and the user may initiate the request to acquire the latest leaderboard data.

Step S302 contains step S3020, step S3022 and step S3024.

In step S3020, the contribution score of the user is received, by the user status monitor 106, for example.

In step S3022, the number of times of receiving the request is detected, by the user interface 102, for example.

In step S3024, the status parameter of the endpoint corresponding to the request is received, by the endpoint status monitor 104, for example. The status parameter may indicate a status or a status prediction of the endpoint.

In step S304, the delay time length for the request transmission is determined, by the transmission timing controller 108, for example. The delay time length may be determined according to the number of times of receiving the request (in a period of time), the status parameter of the endpoint, and/or the contribution score of the user.

In step S306, the request is input or updated into a request table or a request queue, such as the request table 118. The determined time delay length for transmission of the request is also stored in the request table along with the request.

In step S308, the user terminal judges if the user is still at the user interface or the feature wherein he/she initiated the request. If false, the flow goes to step S310. If true, the flow goes to step S312. In some embodiments, the judgment may be performed by the user interface 102 or by the application.

In step S310, the request is removed from the request table. Since the user is determined to have left the feature or the user interface wherein the request was initiated, there is no need to continue the corresponding data accessing. This mechanism can prevent unnecessary resource waste.

In step S312, the user terminal sends the request to the server, by the transmitting unit 110, for example. The request would be sent at the determined transmission timing (or after the determined delay time length). There may be a clock unit, within the user terminal, configured to determine the delay time length to have elapsed.

In step S314, the server sends a response to the user terminal. The response includes the data requested by the user, such as leaderboard information.

In step S316, the application (or the feature of the application) checks if the responded data contains error or indicates an outage of the server. If false, the flow goes to step S318. If true, the flow goes to step S320.

In step S318, the user terminal displays the requested result on the UI (of the application) according to the responded data. The data accessing is successfully done.

In step S320, the user terminal displays a message indicating an error, a busy server or a server outage, according to the response data.

Note that, in the embodiment shown in FIG. 4, there is a route from step S3024 to step S320. In this embodiment, if the status parameter received at step S3024 indicates that the server/endpoint is in a very poor condition such as an outage status, the flow goes directly to step S320. Therefore, when the server/endpoint is in an outage condition, unnecessary resource consuming or data transmission can be prevented by skipping steps S304 to S316. The mechanism is beneficial to both the user terminal and the server.

Figure 5:
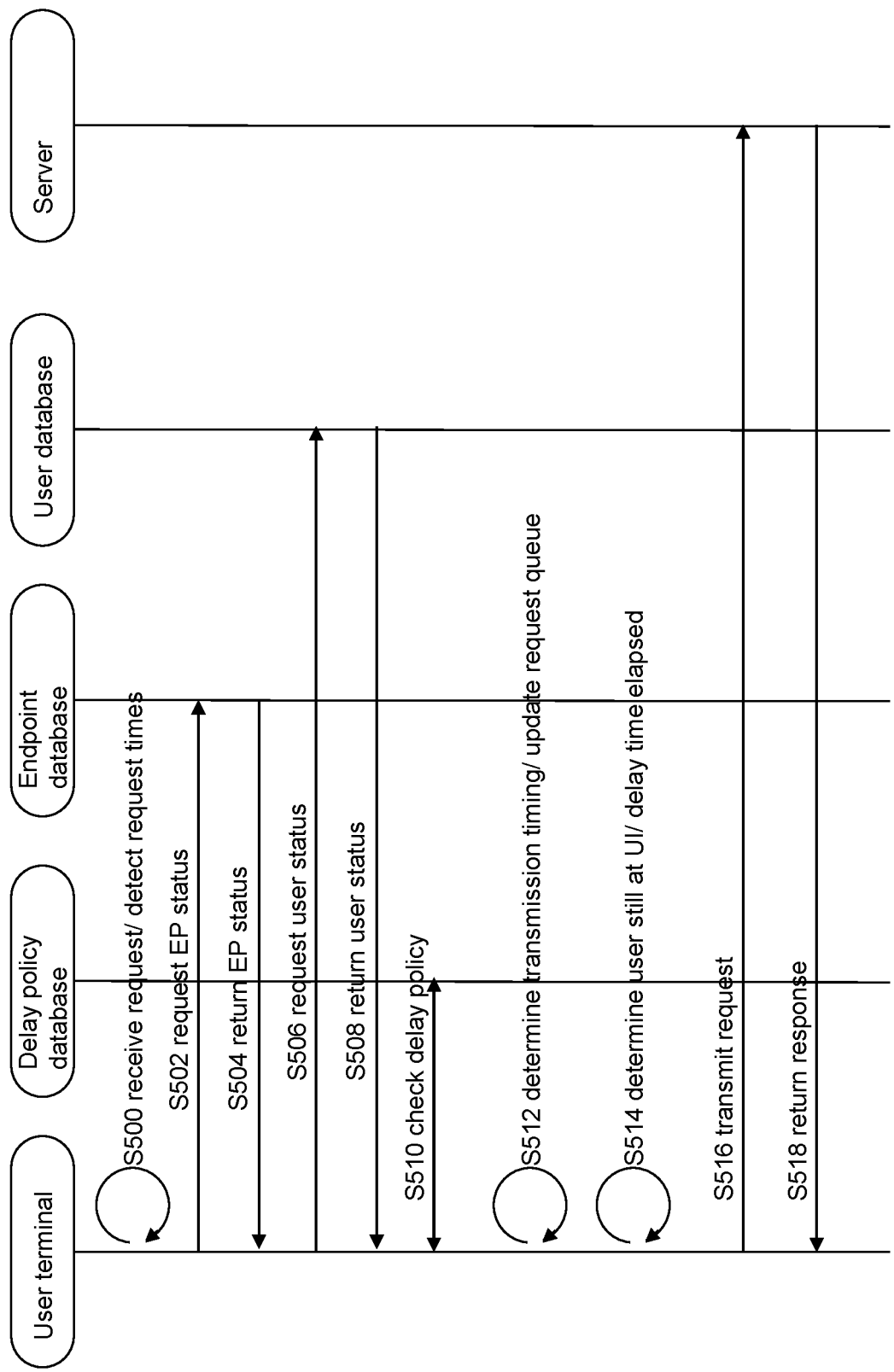
FIG. 5 shows an exemplary time sequence in accordance with some embodiments of the present disclosure.

FIG. 5 shows an exemplary time sequence in accordance with some embodiments of the present disclosure.

In step S500, the user terminal receives a request and detects the request times (or the number of times of receiving the request).

In step S502, the user terminal accesses the endpoint database to request for the endpoint (EP) status (or status prediction) of the endpoint corresponding to the request.

In step S504, the endpoint database returns the endpoint status to the user terminal.

In step S506, the user terminal accesses the user database to request for the user status data, such as user contribution data. The user status data corresponds to the user who initiated the request.

In step S508, the user database returns the user status data to the user terminal.

In step S510, the user terminal accesses the delay policy database (which may or may not reside on the user terminal) to check the delay policy for transmitting the request to a server. The delay policy may depend or may be correlated to the request times, the endpoint status (or status prediction), and/or the user status data.

In step S512, the user terminal determines the timing (or the delay time length) to transmit the request to the server according to the delay policy accessed in step S510. The user terminal updates the information into the request queue.

In step S514, the user terminal determines the user is still at the UI wherein the request was initiated, and determines that the delay time length has elapsed.

In step S516, the user terminal transmits the request to the server at the determined transmission timing to request for the data corresponding to the request.

In step S518, the server returns a response including the requested data to the user terminal. The data accessing has been completed successfully.

Figure 6:
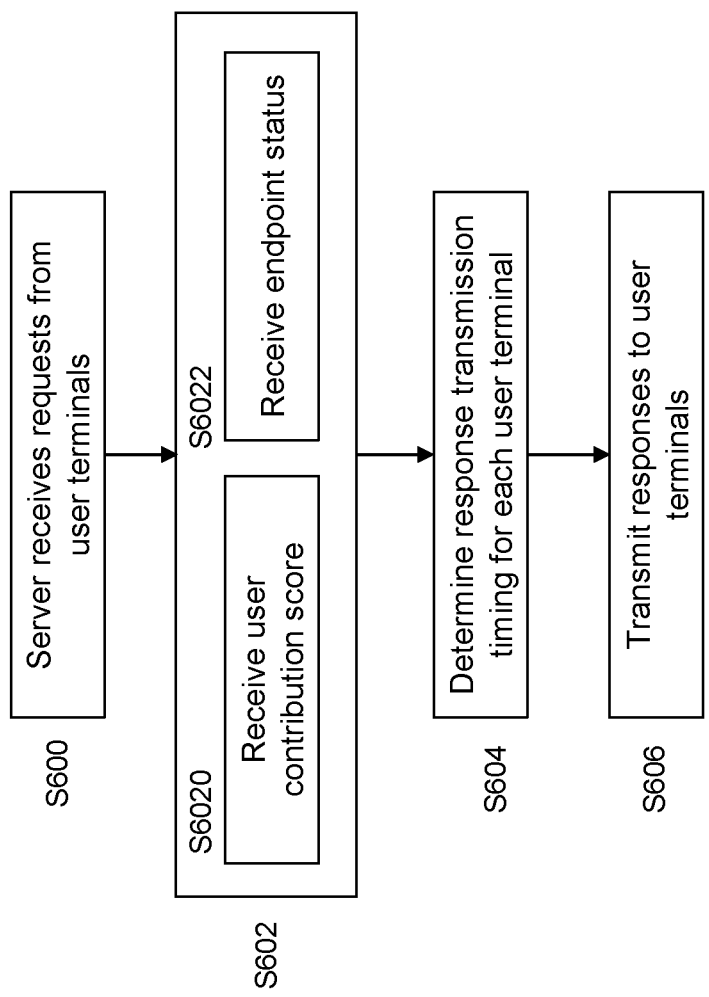
FIG. 6 shows an exemplary flow chart in accordance with some embodiments of the present disclosure.

FIG. 6 shows an exemplary flow chart in accordance with some embodiments of the present disclosure.

In step S600, the server receives requests from different user terminals.

Step S602 includes step S6020 and step S6022.

In step S6020, the server accesses a user database (which may or may not reside on the server) to request for contribution scores of the users who initiated the requests.

In step S6022, the server accesses an endpoint database (which may or may not reside on the server) to request for statuses (or status predictions) of the endpoints corresponding to the requests.

In step S604, the server determines the response transmission timing for each request. A response transmission timing is the timing to transmit the response corresponding to a request to the corresponding user terminal.

In some embodiments, the response transmission timing corresponding to a request may be determined according to the contribution score of the user who initiated the request. For example, the response transmission timing may be determined to be earlier/faster if the corresponding request is initiated by a user with a higher contribution score. For example, the response transmission timing may be determined to be later/slower if the corresponding request is initiated by a user with a lower contribution score. The mechanism efficiently allocates the resource such that higher-contribution users can get the requested data earlier.

In some embodiments, the response transmission timing corresponding to a request may be determined according to the status of the endpoint corresponding to the request. For example, the response transmission timing may be determined to be earlier/faster if the status data indicates that the endpoint for the corresponding request is more healthy. For example, the response transmission timing may be determined to be later/slower if the status data indicates that the endpoint for the corresponding request is less healthy. The mechanism dynamically adjusts the loading or processing for different endpoints to make sure all data accessing can be done in a reliable manner.

In step S606, the server transmits the responses to the user terminals at the timings determined in step S604, thereby finishing the data accessing.

Figure 7:
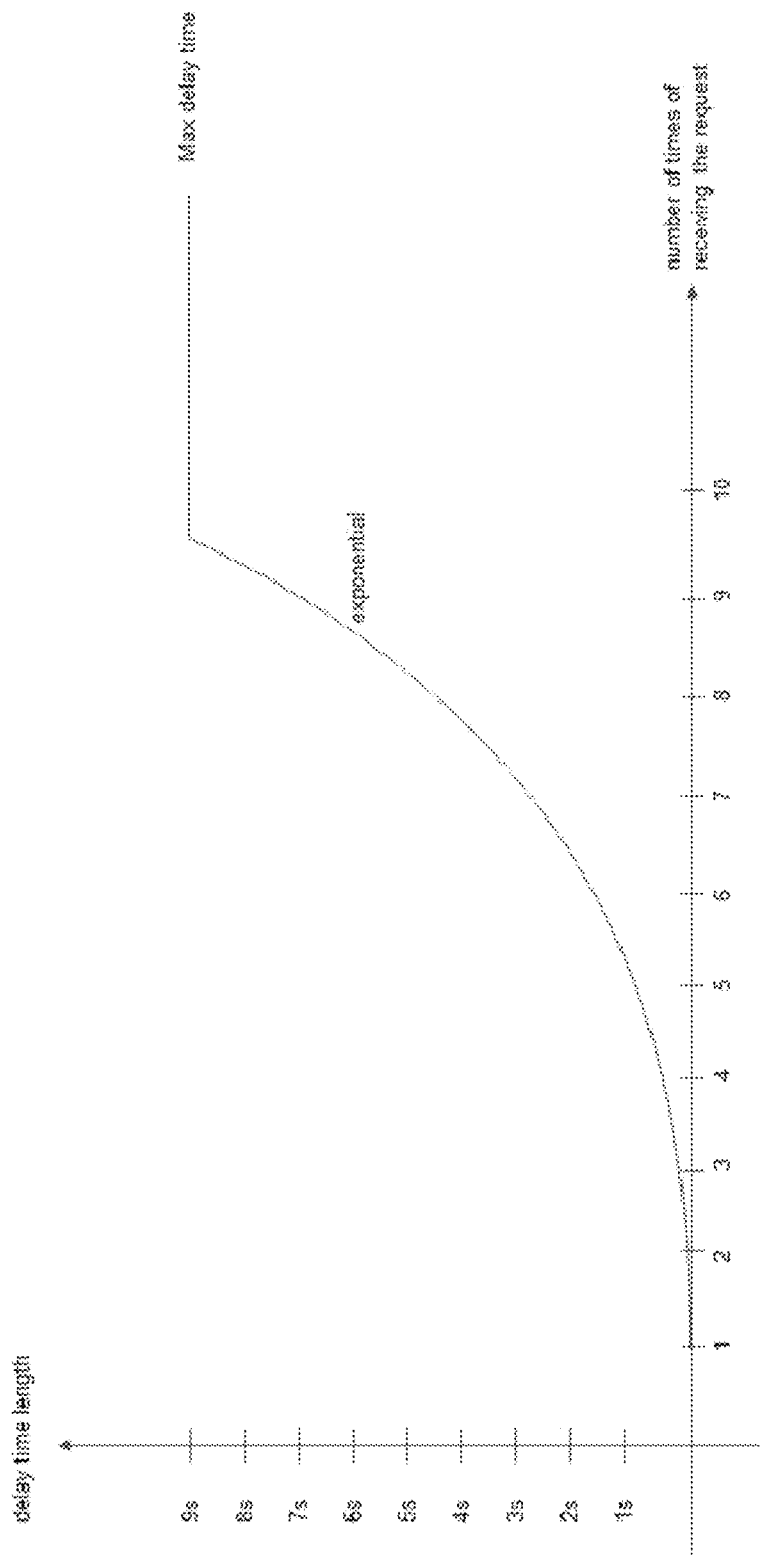
FIG. 7 shows an exemplary criterion for determining the delay time length for transmitting a request from a user terminal to a server in accordance with some embodiments of the present disclosure.

FIG. 7 shows an exemplary criterion for determining the delay time length for transmitting a request from a user terminal to a server in accordance with some embodiments of the present disclosure.

The delay time length is determined according to the number of times of receiving the request (in a period of time). There is an exponential relationship between the delay time length and the number of times of receiving the request. There is a max delay time set for the delay time length. FIG. 7 may correspond to a criterion stored in the delay policy table 116.

Figure 8:
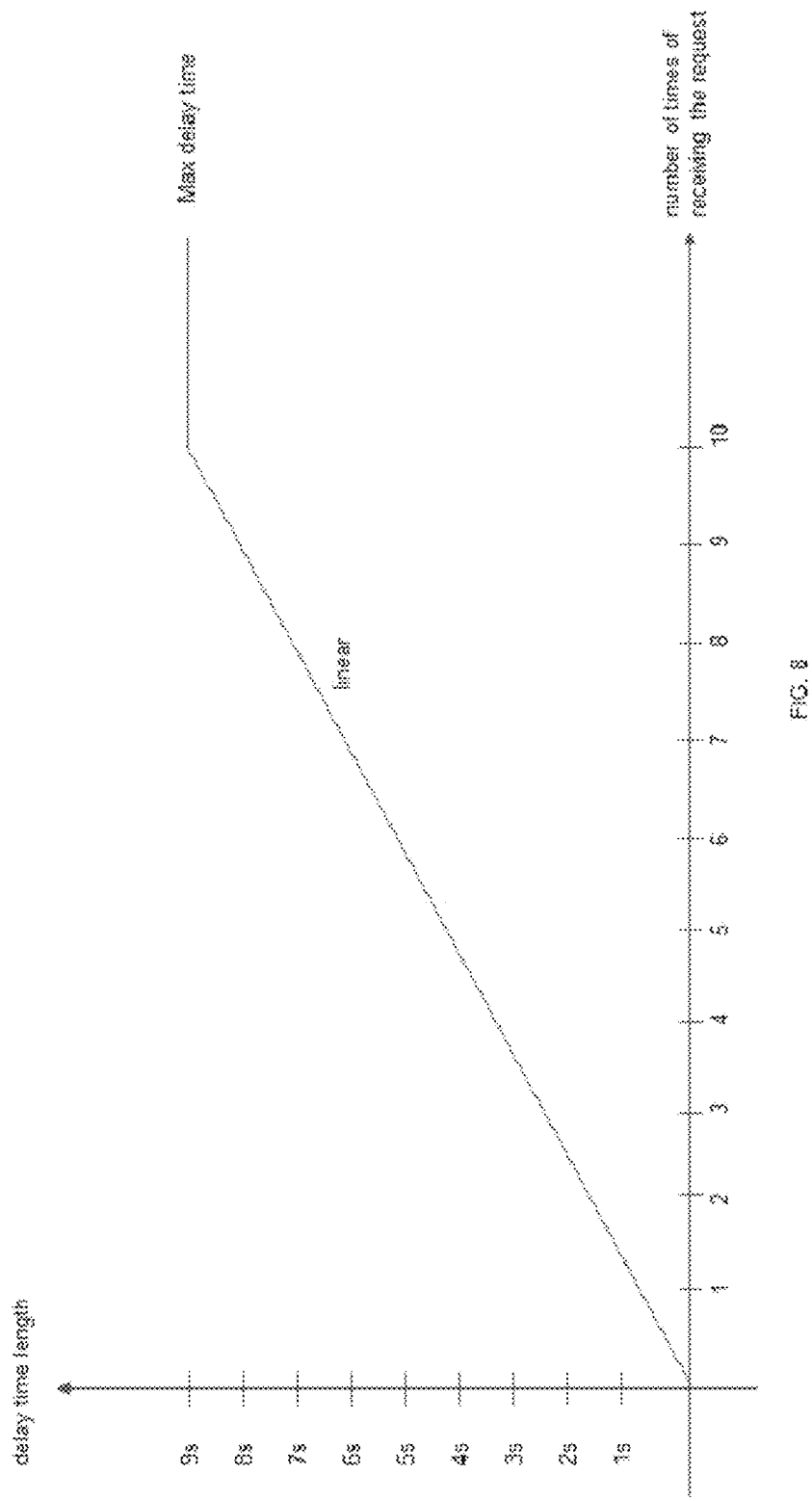
FIG. 8 shows an exemplary criterion for determining the delay time length for transmitting a request from a user terminal to a server in accordance with some embodiments of the present disclosure.

FIG. 8 shows an exemplary criterion for determining the delay time length for transmitting a request from a user terminal to a server in accordance with some embodiments of the present disclosure.

The delay time length is determined according to the number of times of receiving the request (in a period of time). There is a linear relationship between the delay time length and the number of times of receiving the request. There is a max delay time set for the delay time length. FIG. 8 may correspond to a criterion stored in the delay policy table 116.

Figure 9:
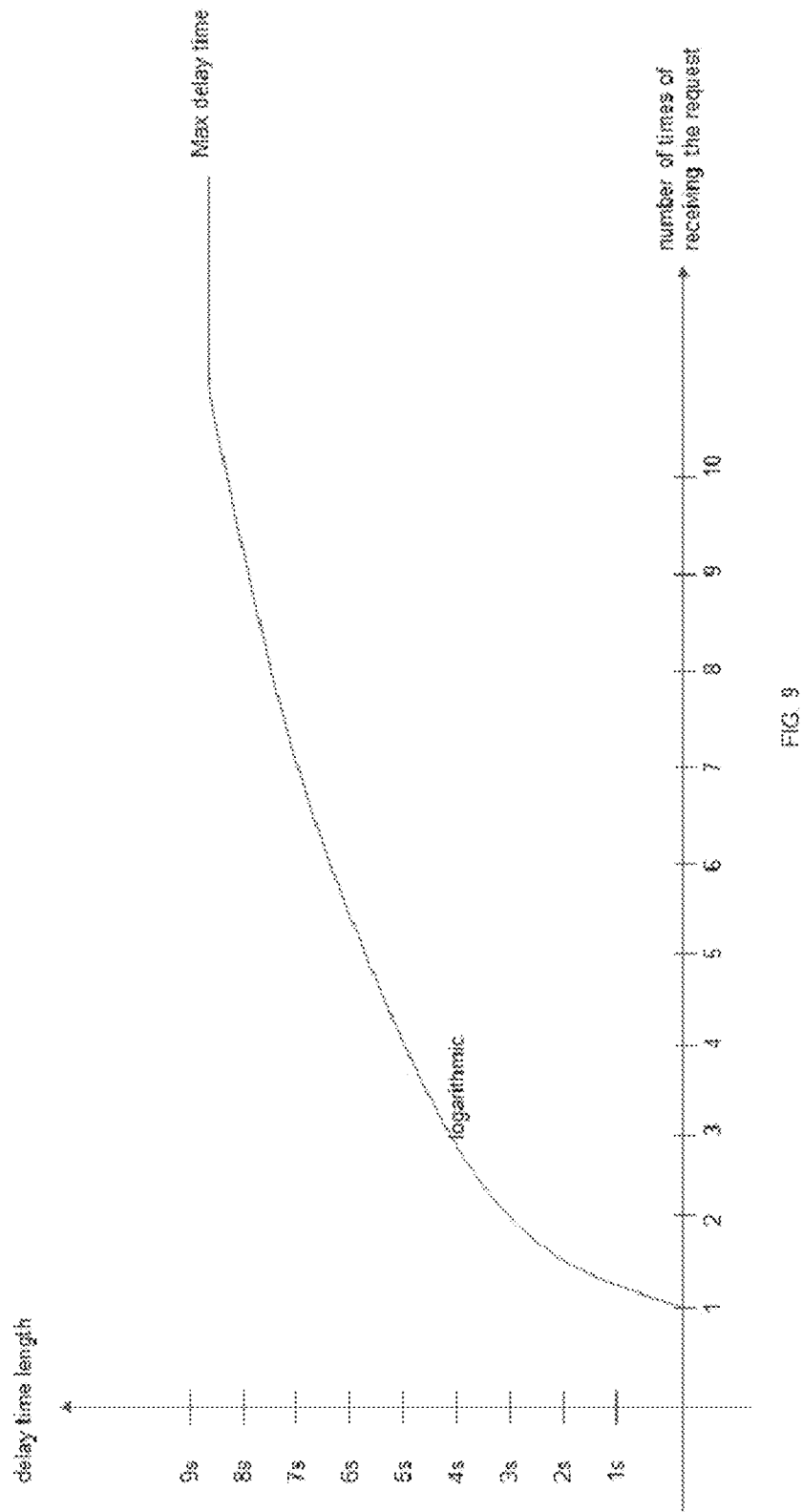
FIG. 9 shows an exemplary criterion for determining the delay time length for transmitting a request from a user terminal to a server in accordance with some embodiments of the present disclosure.

FIG. 9 shows an exemplary criterion for determining the delay time length for transmitting a request from a user terminal to a server in accordance with some embodiments of the present disclosure.

The delay time length is determined according to the number of times of receiving the request (in a period of time). There is a logarithmic relationship between the delay time length and the number of times of receiving the request.

There is a max delay time set for the delay time length. FIG. 9 may correspond to a criterion stored in the delay policy table 116.

In one embodiment of the present disclosure, the user terminal may determine whether the request is received for the first time or not. If the request is received for the first time, the terminal does not apply any delay to the request. If the request is not received for the first time, the user terminal applies the delay which is disclosed in this specification to the request. For example, the request for the first time is processed with normal mode (no delay) and the repetitive requests are processed with exponential delay mode.

Figure 10:
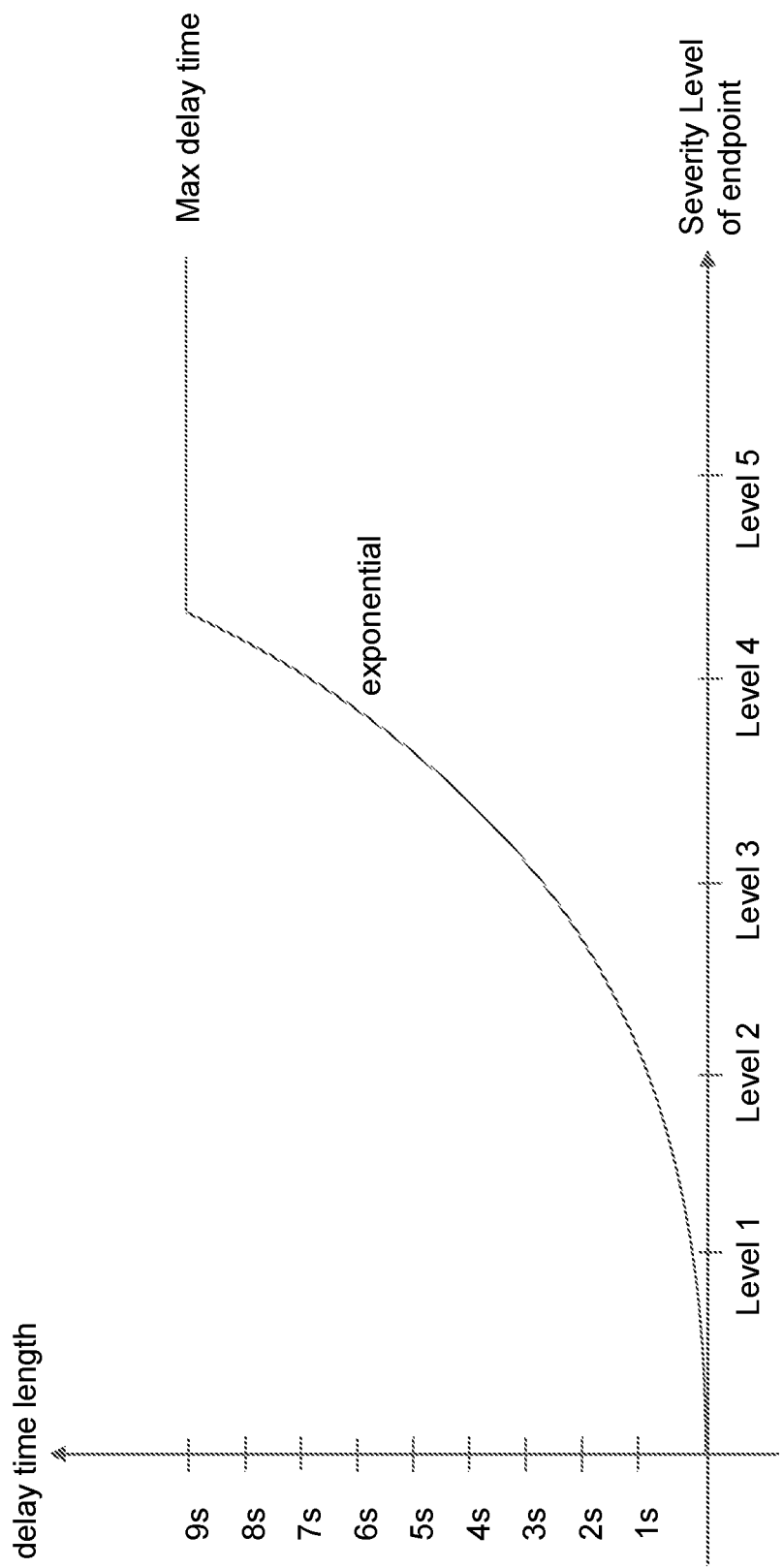
FIG. 10 shows an exemplary criterion for determining the delay time length for transmitting a request from a user terminal to a server in accordance with some embodiments of the present disclosure.

FIG. 10 shows an exemplary criterion for determining the delay time length for transmitting a request from a user terminal to a server in accordance with some embodiments of the present disclosure.

The delay time length is determined according to the severity level of the endpoint corresponding to the request. There is an exponential relationship between the delay time length and the severity level. There is a max delay time set for the delay time length. FIG. 10 may correspond to a criterion stored in the delay policy table 116.

FIG. 11 shows an example of the request table 118.

In this example, with respect to each received request, the corresponding user (or user terminal) who initiated the request, the corresponding endpoint, the receiving times, and the delay time length are recorded in the table. The receiving times may be updated with info from a user interface. The delay time length may be updated with reference to the delay policy table 116. In some embodiments, whenever the request times or the endpoint severity level is updated, the corresponding delay time length will be updated accordingly.

FIG. 12 shows an example of the endpoint status table 112.

In this example, the severity level or unhealthy level of each endpoint is recorded in the table.

FIG. 13 shows an example of the user status table 114.

In this example, status parameters of the user U1 (user of the user terminal), such as the contribution score and the level, are recorded in the table.

FIG. 14 shows an example of the user database 310.

As shown, the user database 310 contains various parameters for different users.

Figure 15:
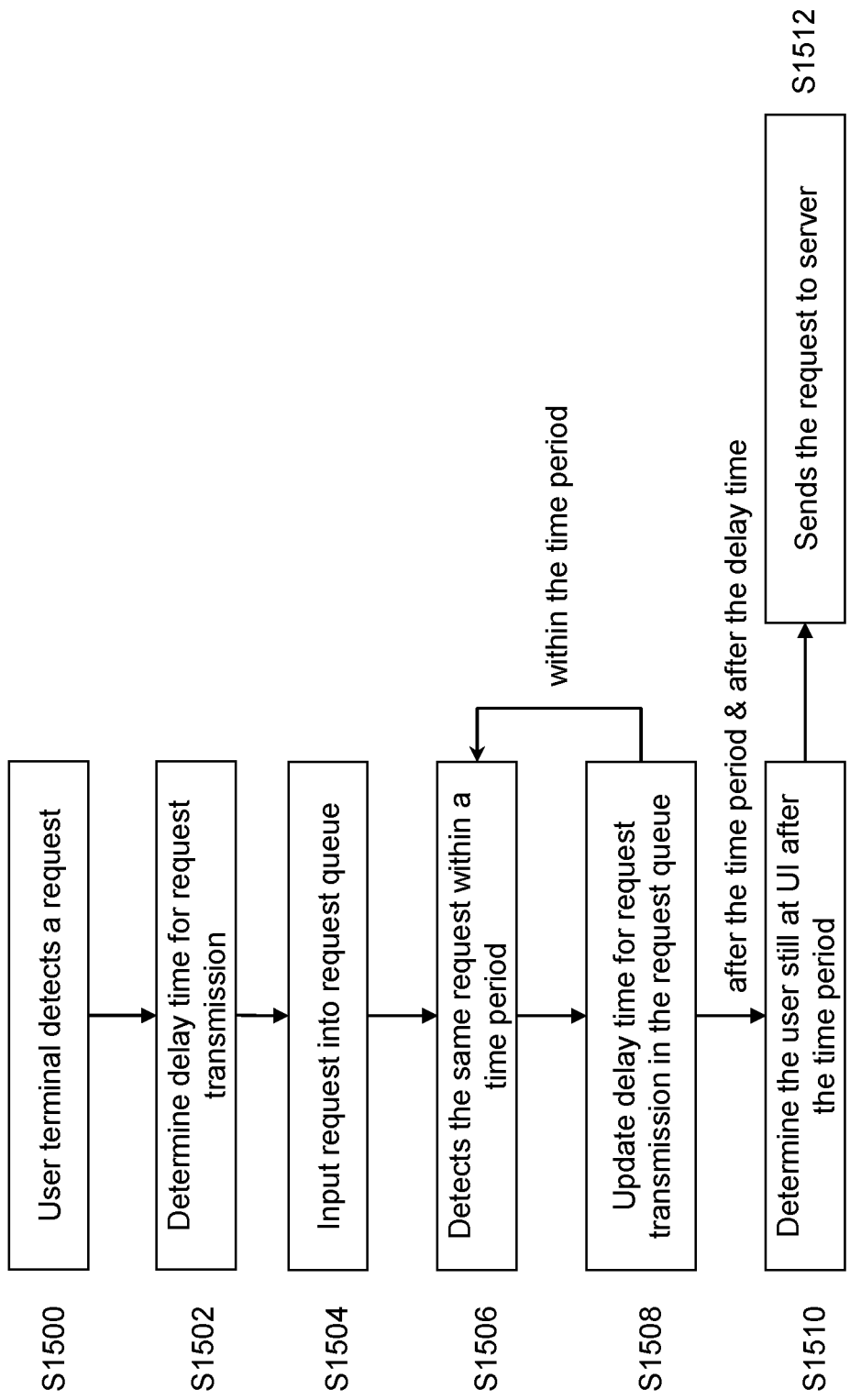
FIG. 15 shows an exemplary flow chart in accordance with some embodiments of the present disclosure.

FIG. 15 shows an exemplary flow chart in accordance with some embodiments of the present disclosure.

In step S1500, a user terminal detects a request from a user.

In step S1502, the user terminal determines a delay time for transmitting the request to a server. In some embodiments, the delay time may be determined according to a status of an endpoint corresponding to the request, and/or according to a contribution score of the user.

In step S1504, the request is input or scheduled into a request queue or a request table.

In step S1506, the user terminal detects or receives the same request again within a predetermined time period. That could be a scenario where the user could not wait for the result to show up and tapped the same button again.

In step S1508, the delay time for transmitting the request to the server is updated according to the number of times of receiving the request. Step S1506 and step S1508 would repeat if the request is repeatedly sent by the user within the predetermined time period. For example, the delay time would be prolonged as the number of receiving the request increases, as specified in FIG. 7, FIG. 8 or FIG. 9. In some embodiments, that may act as a punishment mechanism for those users who tend to repeatedly refresh a page or a feature on an application.

In step S1510, after the predetermined time period, and after the delay time elapses, the user terminal determines that the user is still at the UI wherein he/she initiated the request.

In step S1512, the user terminal transmits the request to the server to ask for the requested data.

The present disclosure discloses improved methods and systems for data accessing. By deploying a delay time to transmit the request from a user terminal to a server according to the request times, the endpoint status, and/or the contribution score, available limited resources can be better allocated and server/endpoint outage can be prevented.

The processing and procedures described in the present disclosure may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, a non-transitory computer-readable medium and a magnetic disk. Further, the processing and procedures described in the specification can be implemented as a computer program corresponding to the processing and procedures, and can be executed by various kinds of computers.

Furthermore, the system or method described in the above embodiments may be integrated into programs stored in a computer-readable non-transitory medium such as a solid state memory device, an optical disk storage device, or a magnetic disk storage device. Alternatively, the programs may be downloaded from a server via the Internet and be executed by processors.

Although technical content and features of the present invention are described above, a person having common knowledge in the technical field of the present invention may still make many variations and modifications without disobeying the teaching and disclosure of the present invention. Therefore, the scope of the present invention is not limited to the embodiments that are already disclosed, but includes another variation and modification that do not disobey the present invention, and is the scope covered by the patent application scope.

F. LIST OF REFERENCE NUMBERS

1 Communication system
10 User terminal
30 Backend server
40 Streaming server
90 Network
100 User terminal
102 User interface
104 Endpoint status monitor
106 User status monitor
108 Transmission timing controller
110 Transmitting unit
112 Endpoint status table
114 User status table
116 Delay policy table
118 Request table
300 Endpoint database
310 User database
S100, S102, S104, S106, S108, S110 Step S300, S302, S304, S306, S308, S310, S312, S314, S316, S318, S320, S3020, S3022, S3024 Step
S500, S502, S504, S506, S508, S510, S512, S514, S516, S518 Step
S600, S602, S604, S606, S6020, S6022 Step
S1500, S1502, S1504, S1506, S1508, S1510, S1512 Step
R1, R2, R3 Request
U1, U2, U3 User
EP1, EP2, EP3 Endpoint
T1, T2, T3 Delay time length

What is claimed is:

1. A method for data accessing, comprising:
receiving a request;
receiving a status parameter of an endpoint corresponding to the request;
receiving a number of times of receiving the request in a period of time; and
determining a delay time length for transmitting the request according to the status parameter of the endpoint or the number of times of receiving the request in the period of time,
wherein the delay time length is determined to be longer when the number of times of receiving the request in the period of time is greater.

2. The method according to claim 1, wherein the delay time length is determined to be longer when the status parameter of the endpoint corresponding to the request indicates a more severe status of the endpoint.

3. The method according to claim 1, further comprising:
receiving the request from a user at a user interface;
storing the request into a request queue;
determining that the user has left the user interface; and
removing the request from the request queue.

4. The method according to claim 1, further comprising:
receiving the request from a user at a user interface;
determining that the user has not left the user interface;
determining the delay time length to have elapsed; and
transmitting the request to a server corresponding to the endpoint.

5. The method according to claim 1, wherein the delay time length is exponentially proportional to the number of times of receiving the request in the period of time.

6. The method according to claim 1, further comprising:
receiving the request from a user at a user interface;
receiving a contribution score corresponding to the user; and
determining the delay time length according to the contribution score.

7. A system for data accessing, comprising one or a plurality of processors, wherein the one or plurality of processors execute a machine-readable instruction to perform:
receiving a request;
receiving a status parameter of an endpoint corresponding to the request;
receiving a number of times of receiving the request in a period of time; and
determining a delay time length for transmitting the request according to the status parameter of the endpoint or the number of times of receiving the request in the period of time,
wherein the delay time length is determined to be longer when the number of times of receiving the request in the period of time is greater.

8. A non-transitory computer-readable medium including a program for data accessing, wherein the program causes one or a plurality of computers to execute:
receiving a request;
receiving a status parameter of an endpoint corresponding to the request;
receiving a number of times of receiving the request in a period of time; and
determining a delay time length for transmitting the request according to the status parameter of the endpoint or the number of times of receiving the request in the period of time,
wherein the delay time length is determined to be longer when the number of times of receiving the request in the period of time is greater.

* * * * *